Jan. 7, 1930.  H. A. MORRIS ET AL  1,742,663
FEEDING AND CUTTING MECHANISM
Filed April 7, 1928  6 Sheets-Sheet 1

Inventors
Howard A. Morris
John P. Aldrich
By Owen & Owen
Attorneys

Jan. 7, 1930.  H. A. MORRIS ET AL  1,742,663
FEEDING AND CUTTING MECHANISM
Filed April 7, 1928   6 Sheets-Sheet 2
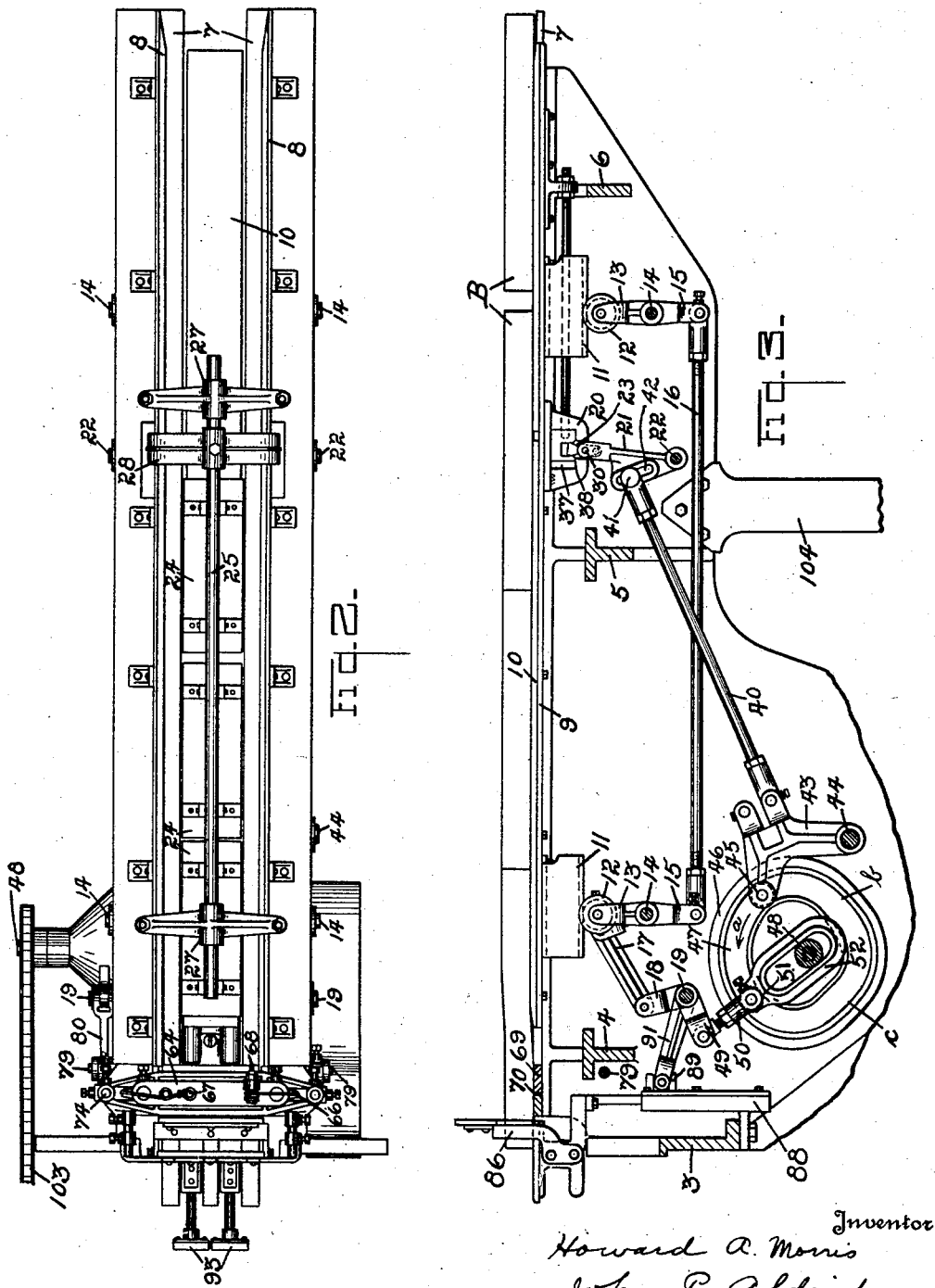
Inventors
Howard A. Morris
John P. Aldrich
By Owen & Owen
Attorneys

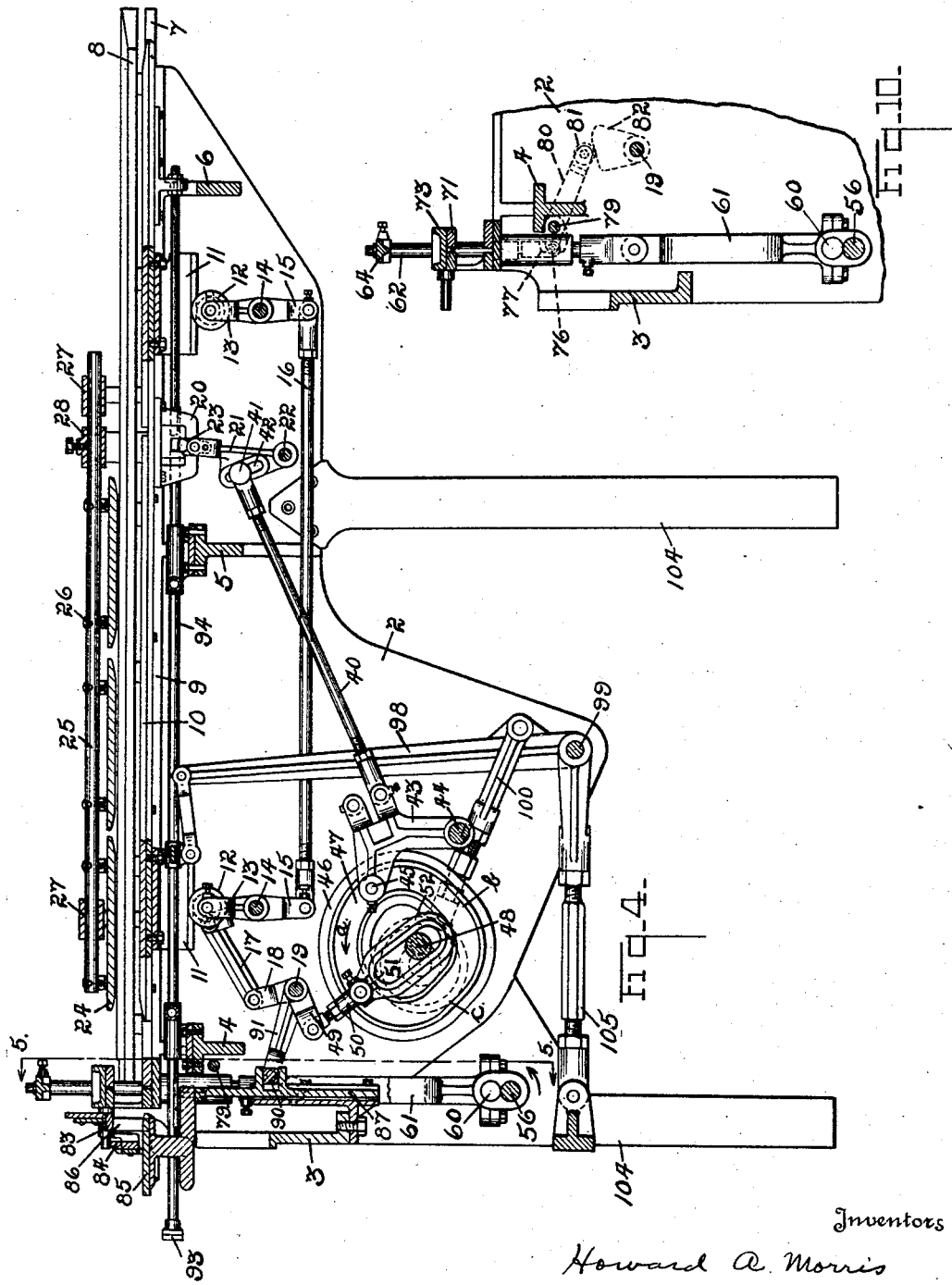

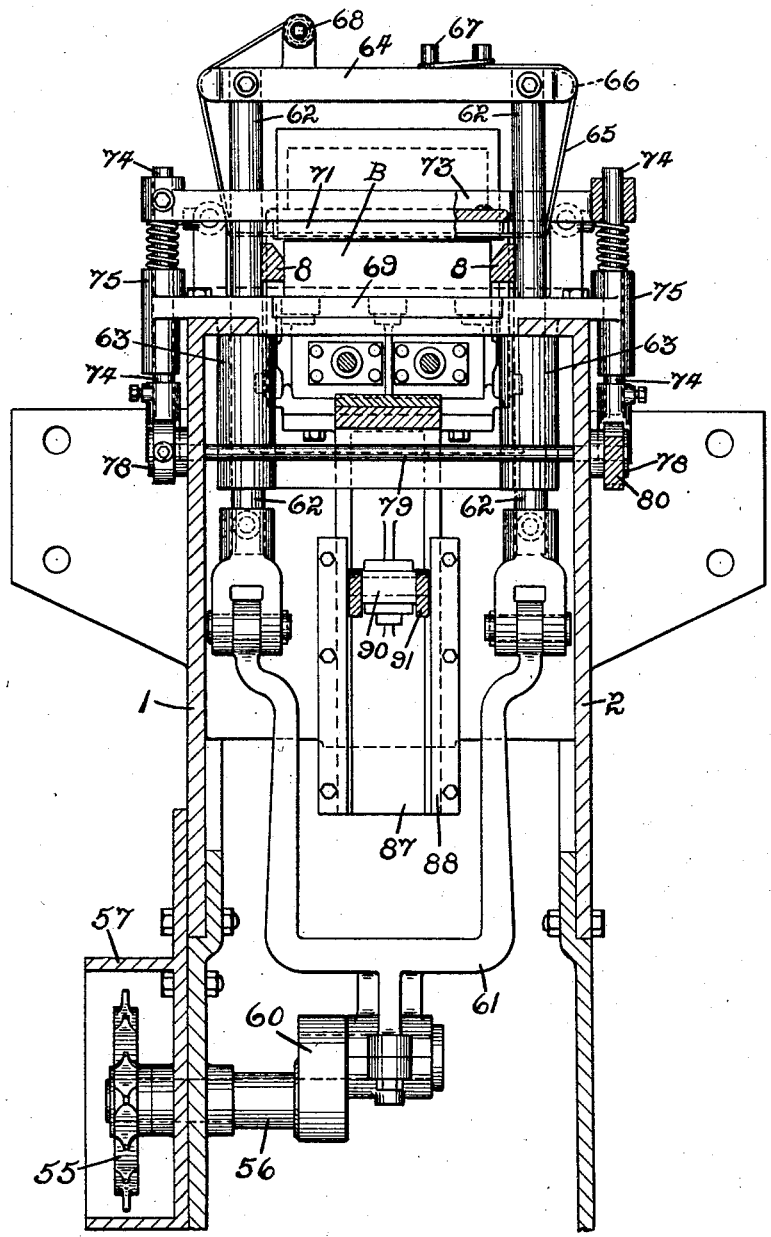

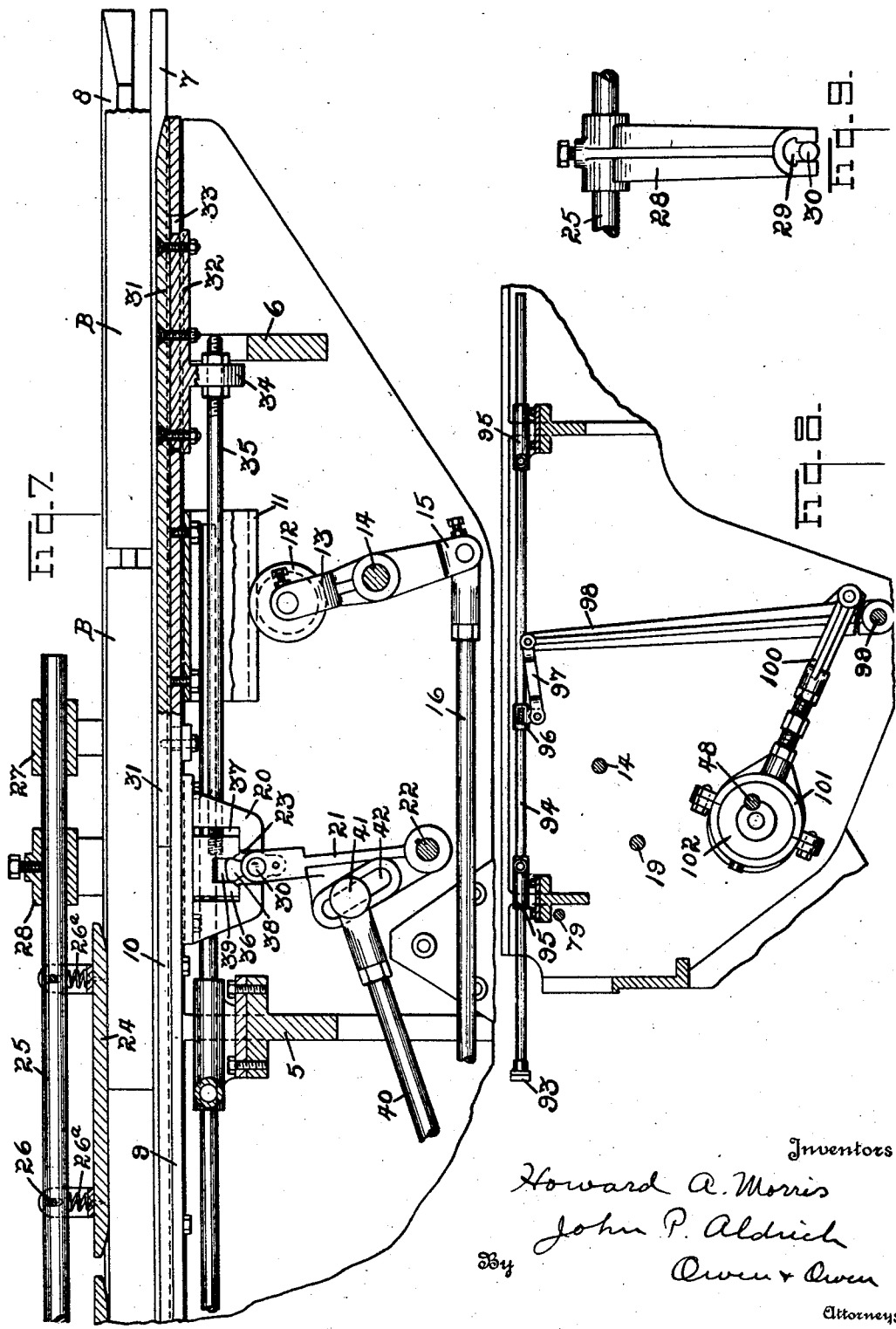

Patented Jan. 7, 1930

1,742,663

UNITED STATES PATENT OFFICE

HOWARD A. MORRIS AND JOHN P. ALDRICH, OF TOLEDO, OHIO, ASSIGNORS TO THE AUTOMAT MOLDING AND FOLDING COMPANY, OF TOLEDO, OHIO, A CORPORATION OF OHIO

FEEDING AND CUTTING MECHANISM

Application filed April 7, 1928. Serial No. 268,143.

This invention relates to feeding and cutting mechanism adapted to receive slabs of butter or similar material, to cut it into pieces of predetermined size while it is advanced step by step through the machine, and then to deliver the same in condition to be wrapped.

The objects of the invention are to provide improved means for accurately gauging the forward movement of the material so that the pieces cut therefrom will always be of exactly the correct size, to provide improved cutting means including improved means for actuating the same, to provide improved means for coordinating the movement of the cutter with the movement of the mechanism for feeding the material thereto, and to provide means for discharging the pieces from the cutter in such a manner that they may be conveyed directly to a wrapping mechanism.

The specific construction of the invention, its mode of operation, and the advantages resulting therefrom, will be more particularly described in connection with the accompanying drawings, which illustrate one embodiment thereof.

In the drawings:—

Fig. 2 is a plan view thereof.

Fig. 3 is a vertical longitudinal section taken near the left-hand side of the machine, with parts of the mechanism omitted.

Fig. 4 is a vertical longitudinal section taken centrally of the machine.

Fig. 5 is a central transverse section on an enlarged scale taken on the line 5—5 of Fig. 4.

Fig. 6 is an enlarged view of the left-hand portion of Fig. 4, with the mechanism in a different position.

Fig. 7 is an enlarged view of the right-hand portion of Fig. 4, showing the mechanism in a position corresponding to Fig. 6.

Fig. 9 is a detail view of the means for advancing the presser bars in coordination with the feed bar.

Fig. 10 is a detail view of the cutter actuating mechanism and the means for clamping the material while the cutter is actuated.

Figure 1:
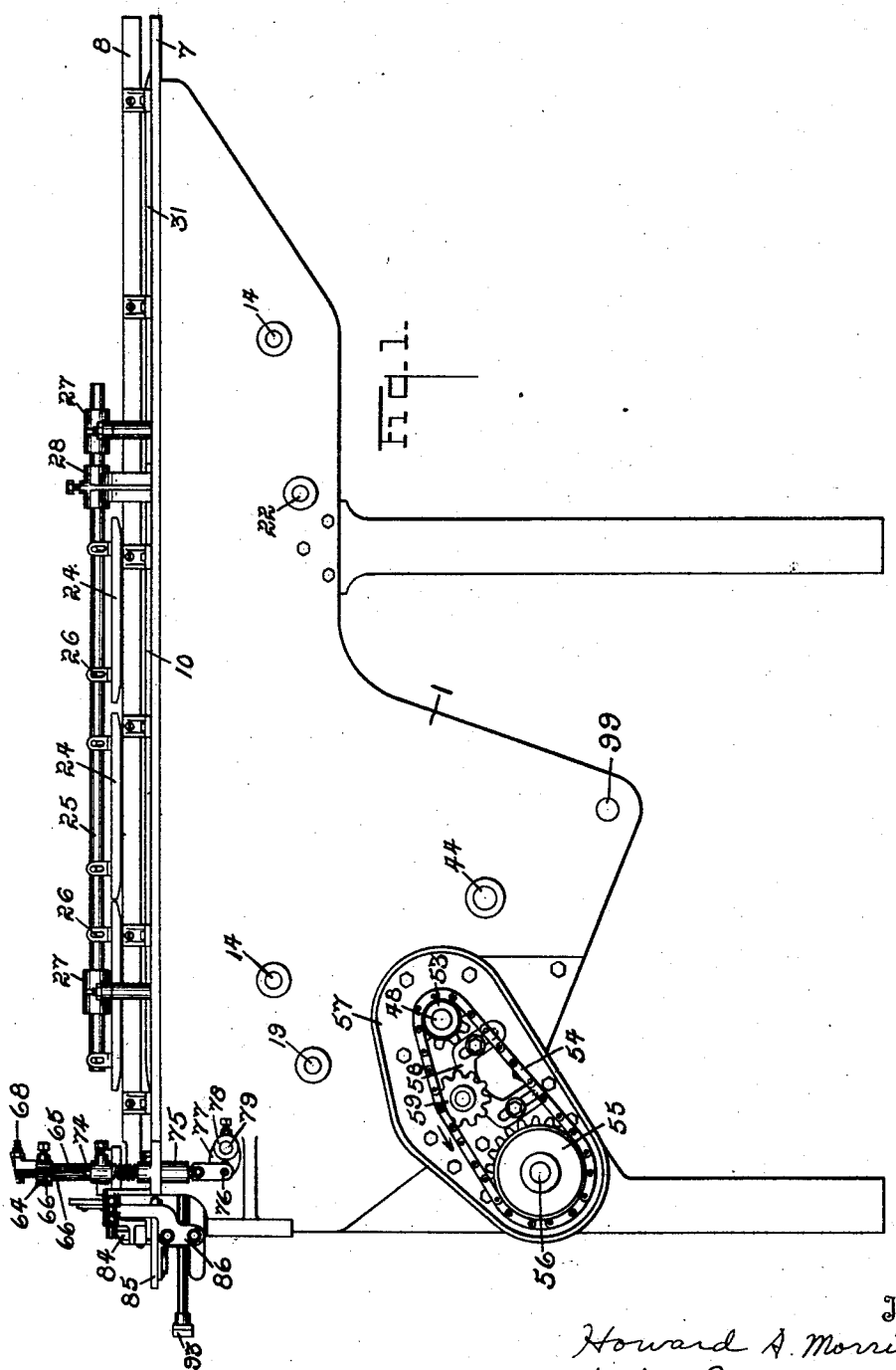
Figure 1 is a side elevation of the machine.
Figure 8:
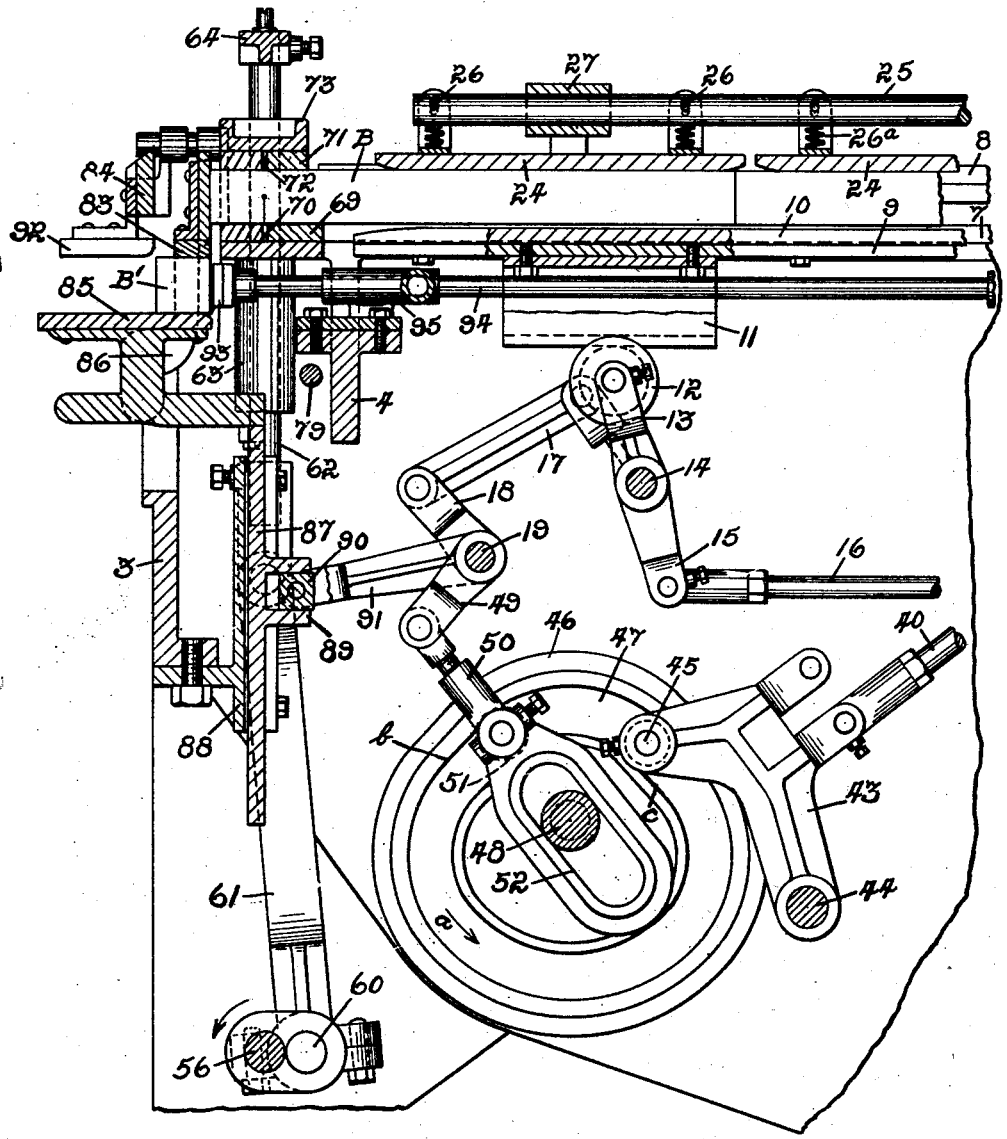
Fig. 8 is a detail view of the ram and the mechanism for actuating the same to discharge the pieces from the machine.

The mechanism which constitutes the subject matter of our invention is supported by a main frame, which may be made from a single casting and which includes side plates 1 and 2 connected by a number of cross bars as indicated at 3, 4, 5 and 6. At the top of the frame there are two spaced tracks 7 with side rails 8 above the same for guiding slabs of butter or other material as they are fed forwardly through the machine by means of a feed bar 9 which has a facing 10 of hard wood or other suitable material. This feed bar has a compound oscillatory motion which is the resultant of an up and down movement and a longitudinally reciprocating movement. That is, the feed bar is moved upwardly between the tracks 7 to lift the material therefrom, is then moved forwardly to advance the material, is then moved downwardly to lay the material upon the tracks and is then moved rearwardly beneath the material.

For controlling the up and down movement of the feed bar 9, depending brackets 11 are secured thereto and rest upon rollers 12 which are mounted in the forked upper ends of arms 13. These arms are intermediately supported on transverse shafts 14 which are supported in the sides of the frame, and the lower ends 15 of the arms are connected by a rod 16, so that the arms are always maintained in parallel relation as they are swung to and fro on the shafts 14. This oscillatory movement of the arms 13 is effected through the medium of a link 17 which connects the forward arm to a crank 18 secured to a shaft 19 mounted transversely of the main frame. Means for rocking the shaft 19 to oscillate the arms 13 for raising or lowering the feed bar 9 will be hereinafter explained.

For effecting the longitudinal reciprocatory movement of the feed bar 9, a depending bracket 20 is secured thereto and a lever 21, supported at its lower end on a shaft 22 mounted transversely of the frame, extends upwardly into a slot 23 formed in the bracket 20. Thus a rocking movement of the lever 21 on the shaft 22 causes a longitudinal reciprocatory movement of the feed bar without interfering with the up and down movement of the bar.

In order to control accurately the step by step movement of the slabs B on the feed bars, a number of presser bars or plates 24 are provided to bear against the upper surface of the slabs when they are raised from the tracks 7. These presser bars are supported from a longitudinal shaft 25 by means of pin and slot connections 26, and are adapted to be urged downwardly against the material by means of small coil springs 26$^a$. The shaft 25 is mounted for reciprocation in bearings 27, which are supported from the sides of the main frame. A yoke 28 is adjustably secured to the shaft 25 and the arms of this yoke have slotted ends 29 adapted to receive a pin 30 carried by the lever 21, so that the shaft 25 and presser bars 24 are reciprocated in unison with the feed bar 9.

As the slabs B are placed upon the rear ends of the tracks 7 and subsequently brought underneath the first presser bar 24, it is important that the front end of each successive slab should be forced firmly into abutting relation to the rear end of the preceding slab. In order to insure such relation, the rear end of the feeder bar 9 is provided with a separate facing section 31 to which is secured a separate backing plate 32. Provision is made for causing the section 31 to have a greater amplitude of movement than the feed bar itself. The backing plate 32 extends through a slot 33 in the feed bar 9 and is formed with a lug 34 which is connected by an adjustable pitman 35 to a block 36 slidably mounted in a guideway 37 formed in the bracket 20. The lever 21 has an upwardly projecting tongue 38 which extends into a slot 39 in the block 36. Since the extremity of the tongue 38 is farther from the center of oscillation than is the pin 30, the amplitude of movement of the block 36 and the facing strip 31 will be correspondingly greater than that of the feed bar 9 and the facing 10. Thus if the last slab placed on the tracks 7 should be slightly spaced from the preceding slab, it will soon overtake it and be pressed firmly against the same.

The oscillatory movement of the lever 21 is effected by means of a pitman 40 having at its rear end a pin 41 which may be adjustably connected to the lever by means of an inclined slot 42. The front end of the pitman 40 is connected to a rock arm 43 mounted on a transverse shaft 44 which is supported in the sides of the main frame. The end of the rock arm 43 carries a roller 45 by means of which the movement of the rock arm is controlled.

For effecting the oscillatory movement of the arm 43 and the shaft 19, a cam 46 having a track 47 is secured on a transverse shaft 48 which is mounted in the sides of the main frame and adapted to be continuously driven. An arm 49 is secured to the shaft 19 and is connected at its outer end to a pitman 50 which carries a roller 51. The roller 45 on the end of the arm 43 and the roller 51 carried by the pitman 50 are both guided in the cam track 47. The free end of the pitman 50 is formed with a yoke 52 through which the shaft 48 extends and by which the angular position of the pitman is maintained. Through the medium of the pitman 50 and the rock arm 43, the cam track 47 controls the movement of the feed bar 9 to cause the desired step by step movement of the material.

In order to drive the cutter in coordination with the feeding mechanism, a sprocket wheel 53 is secured to one end of the shaft 48. This sprocket wheel is connected by a chain drive 54 to a sprocket wheel 55 secured to a crank shaft 56. This sprocket gearing is enclosed by a suitable housing 57 and a suitable chain tightener 58 may be provided, with an idler 59 over which the sprocket chain passes. The shaft 56 has a crank 60 which is connected by a yoke 61 to bars 62 which are mounted for reciprocatory movement in vertically disposed sleeves 63 secured to the main frame. The bars 62 with a cross head 64 which connects their upper ends constitute a carriage for the cutter 65. This cutter is in the form of a small wire which passes through slots in the bars 62 with its ends extending upwardly therefrom and through grooves 66 formed in the outer ends of the cross head. The ends of the cutter wire are secured to pegs 67 and 68 respectively mounted in the cross head 64. One of these pegs, as 68, is arranged to be turned by means of a key so as to adjust the tension of the cutter. The sprocket wheel 55 has twice the diameter of the sprocket wheel 53 so that the crank 60 moves through an arc of 180° while the cam 46 makes a complete revolution. Thus, after each complete cycle of the feeding mechanism effecting one step in the forward movement of the material the cutter moves from its uppermost position to its lowermost position, or vice versa. That is, the cutting stroke is first in one direction and then in the other.

As the material is fed forwardly along the tracks 7 beyond the end of the feed bar 9 it is delivered to a cutter block 69 which is provided with a slot 70 for receiving the cutting wire 65 at the termination of the downward cutting stroke. Above the path of the material is an upper cutting block 71 provided with a slot 72 for receiving the cutting wire 65 at the termination of its upward cutting stroke. The block 71 is secured to a transverse bar 73 which has a restricted vertical movement, moving upwardly just prior to the advance movement of the material in order that the same may be unobstructed and moving downwardly just prior to the cutting stroke of the cutter in order to clamp and hold the material in fixed position while it is being cut.

The bar 73 is secured at its ends to vertical rods 74 which are guided in sleeves 75 at the sides of the frame. The lower end of each rod 74 carries a pin 76 which extends between a pair of jaws 77 formed on a sleeve 78, one sleeve being secured to each end of a shaft 79 extending transversely through the frame. One of the sleeves 78 is formed with a rearwardly extending lever arm 80 which carries a roller 81 at its rear end. This roller rests upon a cam 82 carried by the shaft 19, with the result that, each time the shaft 19 is rocked in a direction to lower the feed bar 9 at the end of its forward stroke the lever 80 is rocked in a direction to bring the block 71 into clamping relation to the material which is about to be cut.

It is customary to adjust the machine to cut butter into prints weighing four ounces each, as indicated at B'. After the cutting operation, as the butter is fed forwardly preparatory to the next cutting operation, the print B' is shoved forwardly beneath a bar 83 and behind a fixed wall 84. In this position the print rests upon the rear portion of a shelf 85 to which the bar 83 is rigidly connected by bracket arms 86. The shelf 85 is connected to a carriage 87 which is guided for reciprocation vertically in a guideway 88 secured to one of the transverse bars 3 of the frame. After the print B' is delivered to the shelf 85 the carriage 87, by which the shelf is supported, is lowered preparatory to discharging the print B' from the machine.

For effecting the movement of the carriage 87 the latter is provided with rearwardly extending lugs 89 between which a block 90 is slidably carried. The block 90 is carried by the forked end of a lever arm 91 which is secured to the shaft 19 so that when the shaft 19 is rocked to lower the feed bar 9 at the end of its forward movement the carriage 87 and the shelf 85 are also lowered.

As soon as the shelf 85 has been lowered to the position shown in Fig. 6, the print B' is shoved forwardly and discharged from the machine. During this forward movement the print is guided beneath a bar 92 in order to maintain it in proper position to be delivered to the wrapping machine. The advance of the print B' over the shelf 85 is effected by means of a reciprocatory ram 93 which consists of two heads carried at the forward ends of rods 94 which are mounted for reciprocation in fixed sleeves 95. The rods 94 are connected together by a web 96 which is connected by a link 97 to the upper end of a lever arm 98. This lever arm 98 is pivoted at its lower end on a shaft 99 and is rocked by means of a pitman 100 which is connected at one end to the lever and which is provided at its other end with a strip 101 embracing an eccentric 102 carried by the shaft 48. The connection between the pitman 100 and the lever 98 is comparatively near the fulcrum of the lever so that the comparatively small movement of the pitman effects a much greater movement of the ram 93.

The shaft 48 may be driven by means of a sprocket chain 103 or other gearing from any suitable source of power. The legs 104 which support the main frame are cast separately therefrom and bolted or otherwise secured thereto. The front legs may be steadied by a brace rod 105, as shown in Fig. 4.

In the operation of the machine, assuming that the mechanism is in the position shown in Fig. 4, with the ram 93 still projecting after delivering a print from the machine, while the feed bar 9 has been moved rearwardly by the lever arm 43 and has been raised through the medium of the pitman 50 to lift the material from the tracks 7, while at the same time the carriage 87 and shelf 85 have been raised to their uppermost position, as the shaft 48 continues to rotate in a counter-clockwise direction, the eccentric 102 causes the pitman 100 to swing the lever 98 quickly to retract the ram 93. At the same time, as the cam 46 rotates in the direction of the arrow *a*, the roller 45 riding into the straight portion *b* of the cam track swings the feed bar forwardly to advance the material into position to cut off another print. During this advance the roller 51 is travelling along the arcuate portion of the cam track 47 and maintains the rollers 12 in position to support the feed bar in its uppermost position. At the same time the crank 60 is travelling along the uppermost portion of its orbit and consequently there is very little movement of the knife carriage. As the feed bar reaches the end of its forward movement the roller 51 rides into the straight portion *b* of the cam track and the feed bar is lowered out of contact with the butter. While the feed bar is thus lowered the roller 45 rides along the straight portion *c* of the cam track, thus causing the feed bar 9 to swing rearwardly. While the feed bar is thus disengaged from the butter, as the shaft 19 is rocked in a counter-clockwise direction, the cam 82 engages the roller 81 at the rear end of the lever 80 and moves the block 71 into clamping relation to the butter. At this time the crank 60 is swinging downwardly, and eventually causes the cutting wire 65 to move across the butter and to cut a print therefrom. Meanwhile, the preceding print which has been shoved onto the shelf 85 has been lowered into the path of the ram 93, as the lever 91 and carriage 87 swing downwardly at the same time as the feed bar is lowered. As soon as the carriage 87 causes this downward movement, the eccentric 102 has reached a position where it immediately initiates the forward movement of the lever 98 and the ram 93. At the completion of this forward movement of the ram all of the parts are again in the position shown in Fig. 4 except that the shaft 56 has rotated only 180° and the crank 60 and the knife carriage are therefore in their lowermost position. The same operation is then repeated except that the knife travels upwardly instead of downwardly. Fig. 6 shows the position of the mechanism during the second operation when the cutter has completed one half of its upward travel. At this point the ram 93 is ready to begin its advance movement and the feed bar 9 has just commenced its rearward movement.

It will be noted that the crank shaft 56 moves through an arc of 180° while the cam shaft 48 is making one complete revolution. The movement of the cutter carriage, the transfer of the successive prints to a position in front of the ram, and the advance of the ram to discharge the print from the machine are all coordinated with the movement of the feeding mechanism so that the butter is fed by successive steps and is cut into prints of the desired size and discharged from the machine in a condition to be operated upon by a wrapping machine, all by a continuous process which may be carried on very rapidly. The butter, during its step by step movement is firmly clamped between the presser plates 24 and the feed bar 9 so that the amplitude of its movement is exactly determined and the prints are of the exact size for which the machine is set. The clamping of the butter between the blocks 69 and 71 while the cutter is operating, further insures the exact cutting of the print. The separate rear facing strip 31 and the greater amplitude of its movement as compared to the movement of the bar 9 with its facing 10 makes it certain that the separate slabs B as they approach the cutter are pressed firmly together end to end and and constitute in effect one continuous slab of butter, so that as the contiguous ends pass the cutter, the same accuracy in the size of the print is maintained.

While the invention is intended primarily for cutting butter, preparatory to wrapping the same, it is apparent that many features of the invention may be used with other material. It is also apparent that many details of construction described herein may be considerably modified without departing materially from the essential features of the invention as hereinafter claimed.

What we claim is:

1. In a machine of the class described, the combination of a vertically reciprocable cutter, means for moving the material step by step into the path of the cutter, said means including means for gripping the material during its forward step and then releasing it, means coordinated with the material moving means for actuating the cutter, and for subsequently discharging the piece which is cut off.

2. In a machine of the class described, the combination of a vertically reciprocable cutter, tracks leading thereto, a feed bar, means for oscillating the feed bar to advance the material step by step, means for clamping the material to the feed bar during the advance movement of the bar and for then releasing it from the bar, and means, coordinated with the movement of the feed bar and clamping means for actuating the cutter.

3. In a machine of the class described, the combination of a vertically reciprocable cutter, tracks leading thereto, a feed bar, means for oscillating the feed bar to advance material step by step along the tracks into the path of the cutter, means for clamping the material to the feed bar during the advance movement of the bar and for then releasing it from the bar, means, coordinated with the movement of the bar and clamping means, for actuating the cutter, a ram beneath the path of the material fed to the cutter, means for lowering each piece, after it is cut off, into the path of the ram, and means for then reciprocating the ram to discharge said piece.

4. In a machine of the class described, the combination of a cutter guided for vertical movement, means for feeding material step by step to the cutter, a cam device for actuating the feeding means, a crank and pitman controlling the movement of the cutter, said crank being geared to the cam device and timed to move the cutter downwardly across the material during the pause in its movement after one forward step thereof, and to move the cutter upwardly across the material during the next pause in the movement of said material.

5. In a machine of the class described, the combination of a cutter guided for rectilinear movement, means for feeding material step by step into the path of the cutter, a cam device for actuating the feeding means, a crank and pitman controlling the movement of the cutter, said crank being geared to the cam device and timed to move the cutter once across the material during the pause in its movement after one forward step thereof and to move the cutter across the material in the opposite direction during the next pause in the movement of the material, a ram beneath the path of the material fed to the cutter, means for lowering each piece, after it is cut off, into the path of the ram, and means for then advancing the ram to discharge said piece.

6. In a machine of the class described, the combination of a cutter guided for rectilinear movement, a feed bar for feeding material intermittently into the path of the cutter, a lever operable to impart an up and down movement to the feed bar, another lever operable to impart longitudinal movement to the feed bar, a cam actuating both of said levers, and means coordinated with the movement of said levers for causing the cutter to move across the path of the material, while the latter is stationary.

7. In a machine of the class described, the combination of a cutter guided for vertical movement, means for feeding material intermittently to the cutter, a lever operable to impart an up and down movement to the feeding means, another lever operable to impart longitudinal movement to the feeding means, a cam for actuating both of said levers, means coordinated with the movement of said levers for causing the cutter to move across the path of the material while the latter is stationary, means for discharging from the machine the pieces which are cut off by the cutter, and means coordinated with the movement of the feeding means and cutter to advance the discharging means as soon as a piece has been cut off.

8. In a machine of the class described, the combination of a cutter guided for vertical movement, means for feeding material intermittently to the cutter, a lever operable to impart an up and down movement to the feeding means, another lever operable to impart longitudinal movement to the feeding means, a cam for actuating both of said levers, means coordinated with the movement of said levers for causing the cutter to move across the path of the material while the latter is stationary, a ram beneath the path of the material fed to the cutter, means for lowering each piece, after it is cut off, into the path of the ram, and means for then advancing the ram to discharge said piece before the lowering means is returned to initial position.

9. In a machine of the class described, the combination of a cutter, a feed bar for feeding material into the path of the cutter, a lever operable to impart an up and down movement to the feed bar, another lever operable to impart longitudinal movement to the feed bar, a cam for actuating both of said levers to cause an oscillator movement of the feed bar to advance the material step by step, means for clamping the material to the feed bar during the advance movement thereof and for then releasing it from the bar, and means coordinated with the movement of said levers for causing the cutter to move across the path of the material while the latter is stationary.

10. In a machine of the class described, the combination of a cutter, a feed bar for feeding material into the path of the cutter, a lever operable to impart an up and down movement to the feed bar, another lever operable to impart longitudinal movement to the feed bar, a cam for actuating both of said levers to cause an oscillatory movement of the feed bar to advance the material step by step, means for clamping the material to the feed bar during the advance movement thereof and for then releasing it from the bar, means coordinated with the movement of said levers for causing the cutter to move across the path of the material and to cut a piece therefrom while the material is held stationary, reciprocable means for discharging from the machine the pieces which are cut off by the cutter, and means coordinated with the movement of the feeding means and cutter to advance the discharging means as soon as a piece has been cut off.

11. In a machine of the class described, the combination of a cutter mounted for vertical movement, means for feeding material step by step across the path of the cutter, upper and lower blocks each having a slot for receiving the cutter at the end of its stroke, means for moving one of said blocks toward the other to clamp the material after each forward step in the movement of the material, and means for moving the cutter once across the path of the material while it is so clamped.

12. In a machine of the class described, the combination of a vertically reciprocable cutter, means for moving the material step by step across the path of the cutter, means for moving the cutter across the path of the material after each forward movement of the material, and means for clamping the material on both sides of the cutter after each forward movement of the material and before the material is engaged by the cutter, said clamping means being released only after the cutter has completed its movement through the material.

13. In a machine of the class described, the combination of means for feeding material step by step, a cutter, means for moving the cutter across the path of the material after each step in the movement of the material, means for clamping the material to the feeding means during the forward movement of the latter, and means on both sides of the cutter for clamping the material to a fixed part of the machine during the engagement of the cutter with the material.

14. In a machine of the class described, the combination of feeding means, a constantly rotatable shaft with a cam thereon, means operated by the cam for actuating the feeding means to move material forwardly step by step, a cutter, means geared to the cam shaft for moving the cutter across the path of the material after each forward step of the material, a second cam controlled by the feed actuating means, and means actuated by said second cam to clamp the material to a fixed part of the machine while the material is engaged by the cutters.

15. In a machine of the class described, the combination of feeding means, a constantly rotatable shaft with a cam thereon, means operated by said cam for actuating the feeding means to move material forwardly step by step, a cutter, means geared to the cam shaft for moving the cutter once only across the material after each forward step of the material, the movement of said cutter being alternately upwardly and downwardly a second cam controlled by the feed actuating means, and means actuated by said second cam to clamp the material to a fixed part of the machine while the material is engaged by the cutter.

16. In a machine of the class described, the combination of a feeding member, a constantly rotatable shaft with a cam thereon, means operated by said cam for actuating the feeding member to intermittently engage the material and move it forwardly step by step, a cutter, means geared to the cam shaft for moving the cutter across the path of the material after each forward step of the material, the movement of the cutter being first in one direction and then in the opposite direction, a second cam controlled by the feed actuating means, means actuated by said second cam to clamp the material to a fixed part of the machine while the material is engaged by the cutter, and means for clamping the material to the feeding member during the forward movement of the latter.

17. In a machine of the class described, the combination of a feeding member, means for operating the feeding member to advance material step by step, a cutter, means for moving the cutter across the path of the material during a pause in the movement of said material, and means actuated by the feed operating means to clamp the material to a fixed part of the machine after each forward step of the material and before and during the engagement of the material by the cutter.

18. In a machine of the class described, the combination of a feeding member, means for operating said feeding member to intermittently engage the material and advance the same step by step, a cutter, means for moving the cutter once across the path of the material during each pause in the movement of said material, means actuated by the feed operating means to clamp the material to a fixed part of the machine after each forward step thereof and before and during its engagement by the cutter, means actuated by the feed operating means for lowering each piece vertically after it is cut off, and means for subsequently discharging said piece from the machine and returning the lowering means to its initial position before the beginning of the next advance movement of the material.

19. In a machine of the class described, the combination of a vertically reciprocable cutter, means for moving material step by step into the path of the cutter, a continuously driven crank having its axis in the plane of movement of the cutter, a yoke connecting the crank with the cutter for operating the latter, means for coordinating the movement of said crank with the material moving means so that the cutter moves across the material while the latter is stationary, a ram beneath the path of the material fed to the cutter, means for lowering each piece, after it is cut off, into the path of the ram, and means for then advancing the ram to discharge said piece before the lowering means is again raised.

In testimony whereof, we have hereunto signed our names to this specification.
HOWARD A. MORRIS.
JOHN P. ALDRICH.